United States Patent
Mileti (10) Patent No.: US 9,079,371 B2
(45) Date of Patent: Jul. 14, 2015

(54) CELL MATRIX SYSTEM AND METHOD FOR MANUFACTURING SAME

(71) Applicant: Robert J. Mileti, Torrington, CT (US)

(72) Inventor: Robert J. Mileti, Torrington, CT (US)

(73) Assignee: TRLBY INNOVATIVE LLC, Torrington, CT (US)

( * ) Notice: Subject to any disclaimer, the term of this patent is extended or adjusted under 35 U.S.C. 154(b) by 319 days.

(21) Appl. No.: 13/708,571

(22) Filed: Dec. 7, 2012

(65) Prior Publication Data

US 2013/0146216 A1 Jun. 13, 2013

Related U.S. Application Data

(60) Provisional application No. 61/567,925, filed on Dec. 7, 2011.

(51) Int. Cl.
| | |
|---|---|
| B32B 3/12 | (2006.01) |
| B32B 3/28 | (2006.01) |
| B29D 22/02 | (2006.01) |
| B65D 13/00 | (2006.01) |
| B31D 5/00 | (2006.01) |
| B29C 65/00 | (2006.01) |
| A47C 27/08 | (2006.01) |

(52) U.S. Cl.
CPC .............. *B29D 22/02* (2013.01); *B29C 66/439* (2013.01); *B31D 5/0073* (2013.01); *B32B 3/12* (2013.01); *B32B 3/28* (2013.01); *B65D 13/00* (2013.01); *A47C 27/081* (2013.01); *Y10T 156/1003* (2015.01); *Y10T 156/1015* (2015.01)

(58) Field of Classification Search
None
See application file for complete search history.

(56) References Cited

U.S. PATENT DOCUMENTS

| | | |
|---|---|---|
| 4,169,002 A | 9/1979 | Larson |
| 4,852,195 A | 8/1989 | Schulman |
| 4,899,406 A | 2/1990 | Sanderson et al. |
| 5,445,274 A | 8/1995 | Pharo |
| 6,684,430 B2 | 2/2004 | Roux |
| 7,482,051 B2 | 1/2009 | Tanaka et al. |
| 7,490,452 B2 | 2/2009 | Alipour et al. |
| 7,674,512 B2 | 3/2010 | Marson et al. |
| 2006/0201960 A1 | 9/2006 | Frayne |
| 2007/0011989 A1 | 1/2007 | Sperry et al. |
| 2011/0027507 A1 | 2/2011 | Mileti |

OTHER PUBLICATIONS

International Search Report and Written Opinion of the International Searching Authority Application No. PCT/US2012/068370 Completed: Jan. 21, 2013; Mailing Date: Feb. 28, 2013 8 pages.

*Primary Examiner* — Barbara J Musser
(74) *Attorney, Agent, or Firm* — St. Onge Steward Johnston & Reens LLC (57) ABSTRACT

A cell matrix expandable structure includes of a plurality of interconnected cells normally in flat form but readily expandable into the form of a container upon the introduction of fluid. The structures may be made out of recyclable films. Methods of manufacturing the cell matrix in a continuous manufacturing process are also disclosed.

24 Claims, 13 Drawing Sheets

FIG. 22

CELL MATRIX SYSTEM AND METHOD FOR MANUFACTURING SAME

FIELD OF THE INVENTION

The present teachings relate generally to systems and methods for manufacturing expandable structures and, more particularly, to cell matrix expandable structures constructed from sealable films.

BACKGROUND OF THE INVENTION

Expandable structures are used in a variety of applications. For example, accordion bags are commonly employed in water and air mattresses, air bags for vehicles, and for storage and delivery of many items, including consumer products, medical, pharmaceutical and consumer fluids.

Expandable cell matrices are also desirable for various other applications. For instance, expandable mattresses, pillows and cushions that can be stored in flat form yet expand into the form of a container upon the introduction of fluid (e.g., air, water, etc.) are desirable in domestic, healthcare, and entertainment settings, among others.

Known cell matrices employ dip molding, vacuum forming, and cast molding of PVC vinyls and polyurethanes, which can be costly. PVC material may be particularly disadvantageous in a healthcare setting where contamination, such as from bodily fluids, requires these type of structures to be disposed after each use.

It is therefore desired to have alternatives to these matrices that are comprised of thin films that are responsive to a body's weight. It is also desired to have the cell matrix comprised of disposable materials that are recyclable, which will minimize user costs and environmental impact.

SUMMARY OF THE INVENTION

The needs set forth herein as well as further and other needs and advantages are addressed by the present embodiments, which illustrate solutions and advantages described below.

One object of the present teachings is to provide cell matrix expandable structures comprised of a plurality of interconnected cells normally in flat form but readily expandable into the form of a container upon the introduction of fluid. The structures may be made out of recyclable films.

It is also an object of the present teachings to provide a novel method for manufacturing thin film expandable structures having a plurality of interconnected cells normally in flat form but readily expandable into the form of a container upon the introduction of fluid. The expandable structures can be manufactured at lower cost and higher speed than previously available.

One method for manufacturing an expandable cell matrix of the present embodiment includes the steps, but is not limited to: providing first and second sheets of material, each sheet having a top, a bottom, and two sides; creating a plurality of folds in the first and second sheets, each fold forming a top extending from the sheet along an axis between the two sides of the sheet; cross sealing together the bottom of the first sheet to the top of the second sheet between each of the plurality of folds on each sheet, such that the folds on each sheet extend outwards from the two sheets; gusset sealing a top of each fold to create a cell shape; and vertical sealing each fold to form a plurality of cells in each fold. The cell matrix is adapted to be stored in a substantially flat form when un-inflated and is adapted to provide support when inflated with a fluid.

Another method for manufacturing an expandable cell matrix of the present embodiment includes the steps, but is not limited to: providing a plurality of sheets of material, each sheet having two sides and arranged so that axes between their two sides are substantially parallel to each other; donut sealing together each adjacent pair of the plurality of sheets using donut seals; end sealing the plurality of sheets by sealing additional sheets of material along at least a portion of the periphery of the plurality of sheets to form tubes; and vertical sealing the tubes to form a row of cells between each vertical seal. The cell matrix is adapted to be stored in a substantially flat form when un-inflated and is adapted to provide support when inflated with a fluid.

Yet another method for manufacturing an expandable cell matrix of the present embodiment includes the steps, but is not limited to: providing a plurality of tubes arranged parallel to each other; sealing together each adjacent pair of the plurality of tubes; end sealing the plurality of tubes by sealing at least a portion of the periphery of the plurality of tubes; and vertical sealing the plurality of tubes to form a row of cells between each vertical seal. The cell matrix is adapted to be stored in a substantially flat form when un-inflated and is adapted to provide support when inflated with a fluid.

One system of an expandable cell matrix of the present embodiment includes, but is not limited to: a plurality of cells; and a port for introducing fluid. The cell matrix system is formed by sealing together a plurality of sheets of material. The plurality of cells creates an array of cells in fluid communication with each other (e.g., a web, etc.). The cell matrix is manufactured using a continuous manufacturing process. The cell matrix is adapted to be stored in a substantially flat form when un-inflated and is adapted to provide support when inflated with a fluid.

Other embodiments of the system and method are described in detail below and are also part of the present teachings.

For a better understanding of the present embodiments, together with other and further aspects thereof, reference is made to the accompanying drawings and detailed description, and their scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments.

Figure 1:
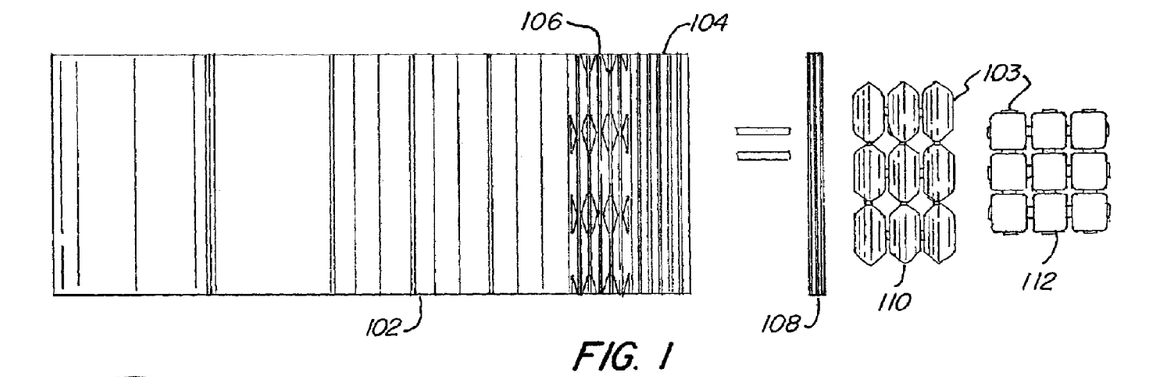
FIG. 1 is a top view of one embodiment of a process for creating an expandable cell matrix according to the present teachings.

Referring to FIG. 1, shown is a top view of one embodiment of a process for creating an expandable cell matrix according to the present teachings. An expandable structure of the present teachings is depicted in un-inflated 108, partially inflated 110, and fully inflated 112 forms. For ease of description, the structure shown contains nine interconnected cells 103 of substantially rectangular configuration configured in a 3×3 matrix, although various shapes and configurations of cells are envisioned. In fully inflated 112 form, the expanded cells 103 may form an inline cell matrix.

Each cell 103 may be formed with a number of seals, such as cross web seals 102 (discussed further below), gusset seals 106 (discussed further below) and vertical seals 104 (discussed further below). Use of the term "seal" herein refers to any method for attaching two structures to each other, including bonding, and the present teachings are not limited to any particular embodiment disclosed herein. Seals may be placed on the top and bottom of each cell, although not limited thereto. It is preferred that the configuration of the cells creates at least two substantially flat surfaces for creating a support surface, although other configurations, such as contoured, may be used.

Figure 2:
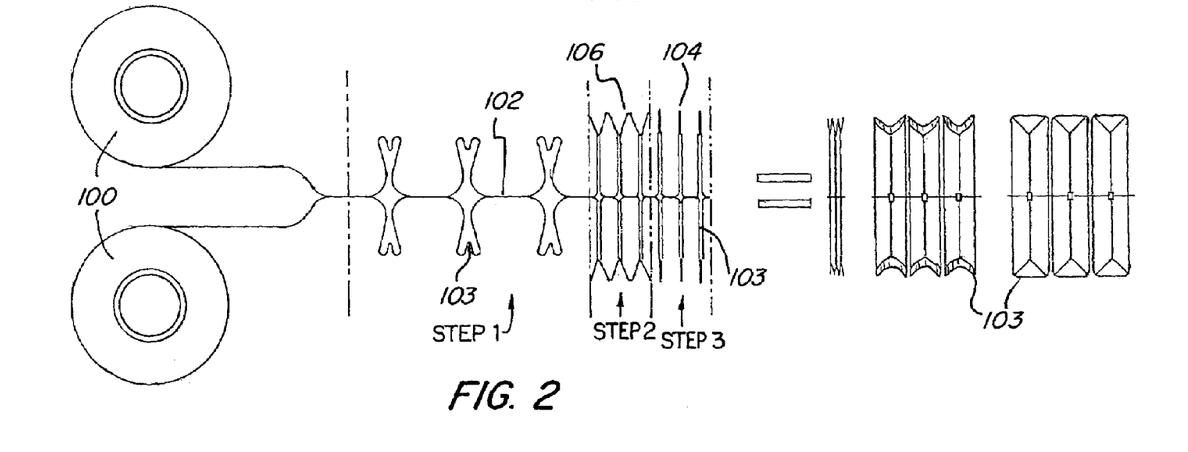
FIG. 2 is a side view of the process of FIG. 1.

Referring to FIG. 2, shown is side view of the process of FIG. 1. For ease of reference, the steps are labeled as 1, 2, 3. However, any number of steps may be utilized, in any order, without deviating from the present teachings. As shown, a first end sheet of material (e.g., thermoplastic, film, etc.) having outer and inner surfaces, two side edges and front and back edge is placed on top of a second sheet of material. The sheets may be provided via upper and lower feed rolls 100.

According to the embodiment shown in "step 1" in FIG. 2, a folding mechanism may place a plurality of undulating folds in the first and second sheets. Between adjacent folded portions, a cross-web seal 102 (discussed further below in relation to FIGS. 3-5) may be placed along the axis running from the first side edge to the second side edge of each sheet causing the inner surfaces of each sheet to seal together. The area between each cross-web seal 102 may be referred to as a base cell 103 (cells may be further partitioned with "vertical seals" as discussed below). According to "step 2", gusset seals 106 (discussed further below in relation to FIGS. 6-8) may help create the desired shape of the cells 103. In "step 3", vertical seals 104 (discussed further in relation to FIGS. 9-12) may be placed in each cell.

Figure 3:
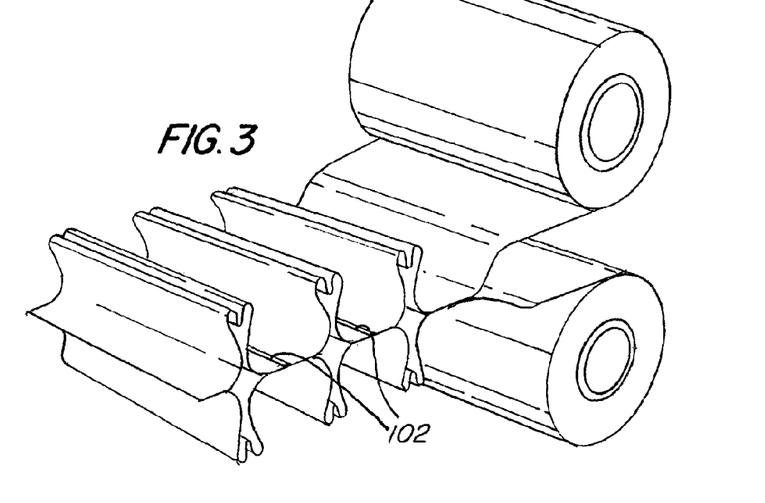
FIG. 3 is a perspective view of a first step of the process of FIG. 1.
Figure 4:
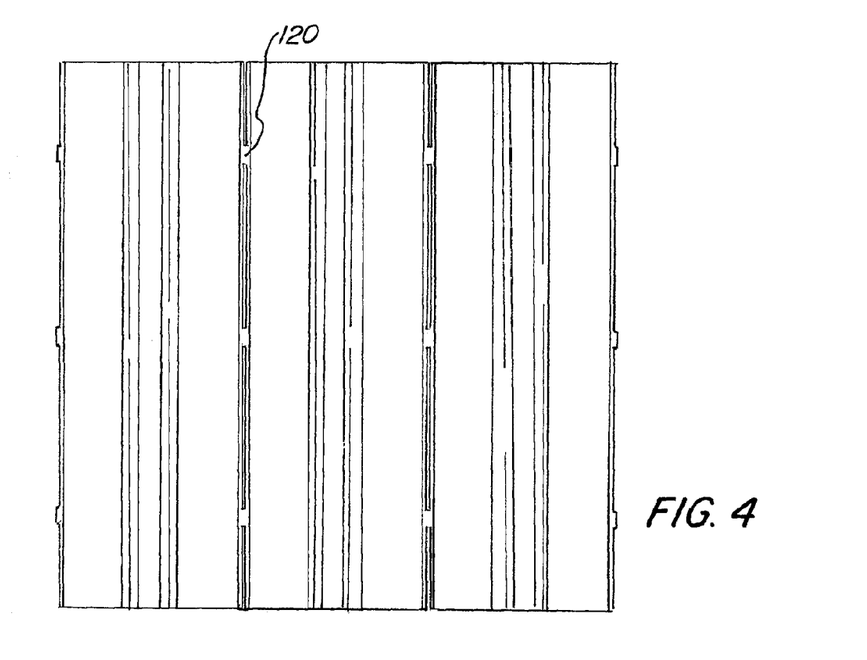
FIG. 4 is a top view of one embodiment of seals used to create a cell matrix according to the present teachings.
Figure 5:
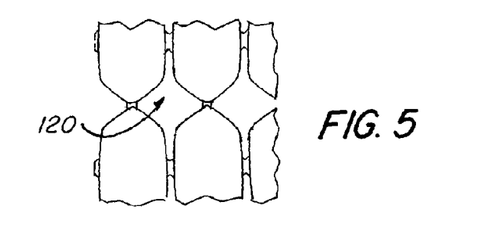
FIG. 5 is a perspective view of openings within and/or between cells of a cell matrix according to the present teachings.

FIGS. 3-5 show various views of the cross-web seal 102 according to "step 1" (shown in FIGS. 1 and 2). Referring now to FIG. 3, shown is a perspective view of a first step of the process of FIG. 1. Shown are three folded portions, each having two undulations, however, the present teachings are not limited to this configuration. The number of folded portions created may correspond to the number of cells desired in an expandable structure and various sized matrices may be used.

FIG. 4 shows a top view of one embodiment of "cross-web" seals used to create a cell matrix according to the present teachings. The upper and lower material (e.g., rolls of film, etc.) may be sealed (e.g., heat-welded, etc.) together to help form the cell matrix. While one embodiment of this seal is shown, one skilled in the art would appreciate that any number of different manufacturing techniques may be used to accomplish this purpose without deviating from the present teachings.

The seals may include openings 120 that allow fluid communication (e.g., air, water, etc.) between adjacent base cells as well as to allow the base cells to separate when inflated (e.g., with air, fluid, etc.). FIG. 5 shows a perspective view of openings 120 within and/or between cells of a cell matrix according to the present teachings. The aperture and openings can be of various sizes depending on the desired shape of the base cell and cell matrix and the present teachings are not limited to any particular embodiments disclosed herein.

Figure 6:
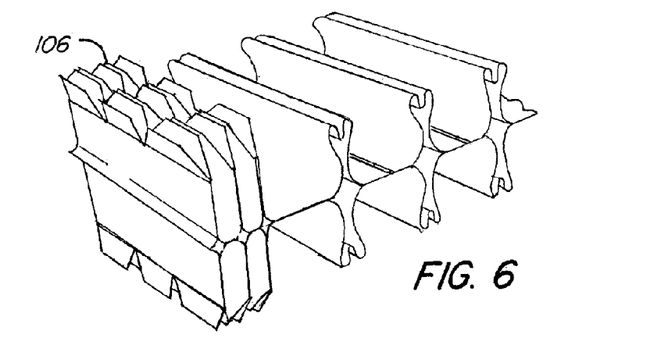
FIG. 6 is a perspective view of a folding process used to manufacture a cell matrix according to the present teachings.
Figure 7:
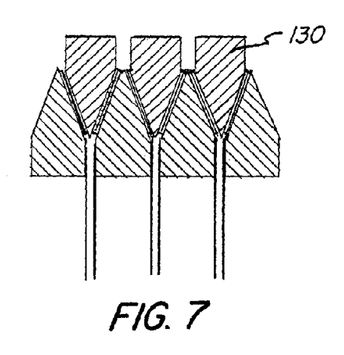
FIG. 7 is a cross sectional view of a sealing head used in manufacturing cells according to the present teachings.
Figure 8:
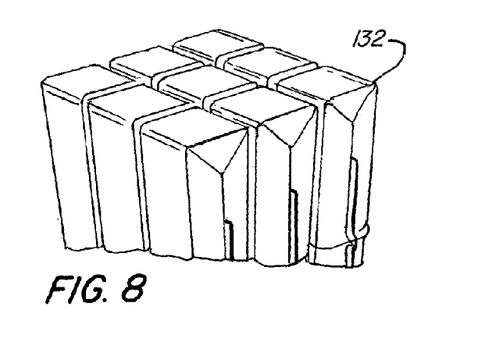
FIG. 8 is a perspective view of flat top cells manufactured according to the present teachings.

Referring now to FIGS. 6-8, shown are various views of the "gusset" seal 106 according to "step 2" (shown in FIGS. 1 and 2). One skilled in the art would appreciate that any number of different manufacturing techniques may be used to accomplish this purpose without deviating from the present teachings, which are not limited to a "gusset" seal. What is desired is that this sealing step help shape the cells, and in this way to allow them to receive a desired amount of fluid. FIG. 6 is a perspective view of a folding process used to manufacture a cell matrix. After the cross-web seals are imparted, although not limited thereto, top and bottom gusset seals 106 may be placed on the outer surface of the first and second sheet along the peaks of each undulation of each folded portion. In one embodiment, the gusset seals 106 are bonded seals.

FIG. 7 is a cross sectional view of a sealing head used in manufacturing cells. Preferably, a sealing head 130 cuts and seals both sides of the bonded cells along the outer surface of each undulation in the folded portion. Various configurations of bonds can be cut and sealed and used to create cells with convex, concave and other surface geometries, although not limited thereto. FIG. 8 is a perspective view of flat top cells manufactured according to the present teachings. As shown in FIG. 8, a cut sealed miter cut 132 may create square, flat top cells.

Figure 9:
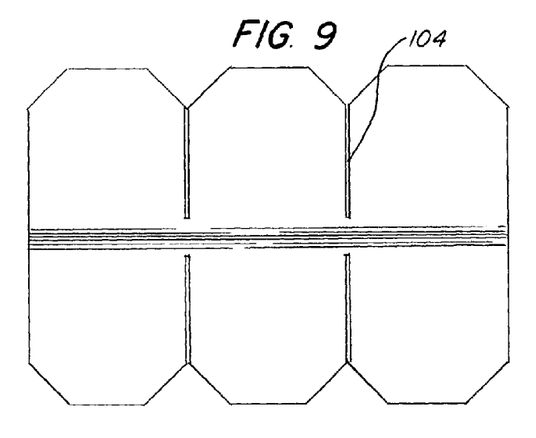
FIG. 9 is a side view of a cell matrix manufactured according to the present teachings.
Figures 10, 12:
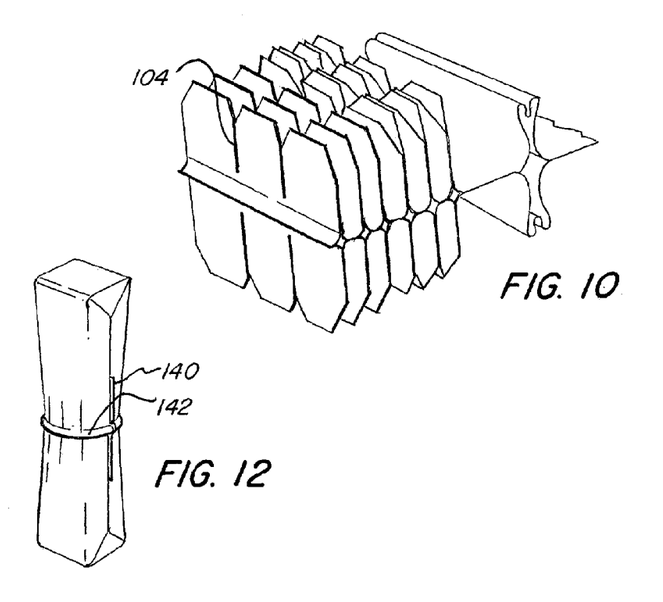
FIG. 10 is a perspective view of three steps of the process of FIG. 1.
FIG. 12 is an isometric view of an expanded cell structure according to the present teachings.

Referring now to FIGS. 9-12, shown are various views of one embodiment of the "vertical" seal 104 according to "step 3" (shown in FIGS. 1 and 2). Again, one skilled in the art would appreciate that any number of different manufacturing techniques may be used to accomplish this purpose without deviating from the present teachings, which are not limited to a "vertical" seal. What may be desired is to partition the base cell into a plurality of cells. After the gusset seals are imparted, although not limited thereto, vertical seals 104 may be placed within a base cell. The seals may run from the base of a bond vertically in the direction of the opposite sheet of material. FIG. 9 is a side view of a cell matrix manufactured according to the present teachings and shows a single base cell having two vertical seals 104. FIG. 10 is a perspective view of the process of FIG. 1.

Figure 11:
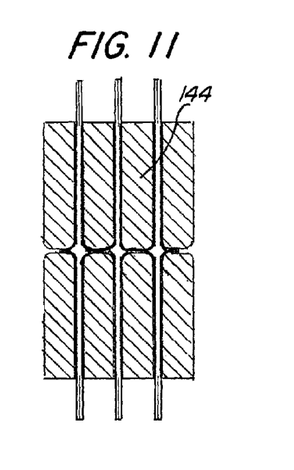
FIG. 11 is a top view of compressed cell structures according to the present teachings.

FIG. 11 is a top view of compressed cell structures and shows use of sealing heads 144 that may compress the base cells laterally. As shown, the vertical seal may not traverse the plane or seal adjoining the first and second sheet. FIG. 12 is an isometric view of an expanded cell structure. An un-sealed area 140 may be located below the vertical cell seals 104 to allow for fluid communication with adjacent seals in the web direction, although not limited thereto. In addition, vertical seals may traverse the plane between the first and second sheet, running along the entire edge of material without interruption, although not limited thereto.

The number of vertical seals imparted may determine the number of cells created within a base cell. The number of cells traversing the width of a sheet may be the number of seals plus one. Accordingly, if a 3×3 matrix is desired, then three base cells (shown in FIG. 2) may be created in "step 2" and two vertical seals 104 added in "step 3".

Edge seals may also be imparted along the vertical uncut areas of the cells along the side edge of the first and second sheet before, after or simultaneously with vertical sealing. As shown in FIG. 12, the vertical uncut areas 140 of the cells that are not along a side edge may maintain their relationship with adjacent cells in the cross web direction. Additionally, tabs 142 on cross web seals may maintain their relationship with adjacent cells.

Figure 13:
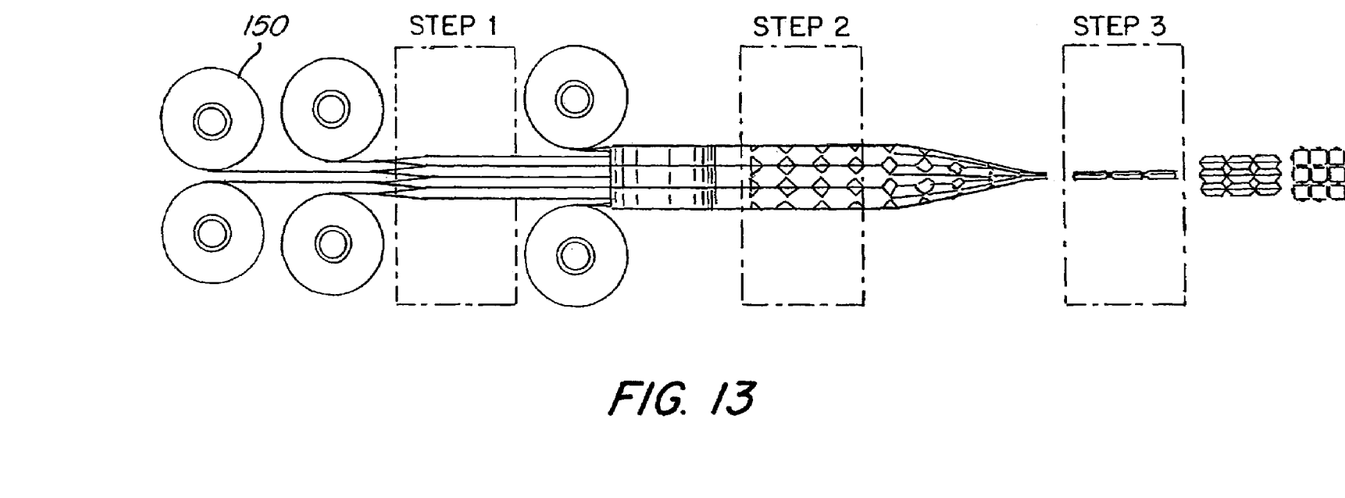
FIG. 13 is a top view of another embodiment of a process for creating an expandable cell matrix according to the present teachings using donut seals.

Referring to FIG. 13, shown is a top view of another embodiment of a process for creating an expandable cell matrix according to the present teachings using donut seals. What is meant by a "donut" seal herein is a seal with a closed perimeter that may or may not provide an opening between adjacent cells. These are generically referred to as "donut" seals because they are often in a circular shape, although not limited thereto. As shown, this embodiment may comprise three steps, namely, adding donut seals 160 (shown in detail in FIGS. 14-16), adding end seals (shown in detail in FIG. 17), and adding vertical seals 104 (shown in detail in FIG. 18).

Figure 14:
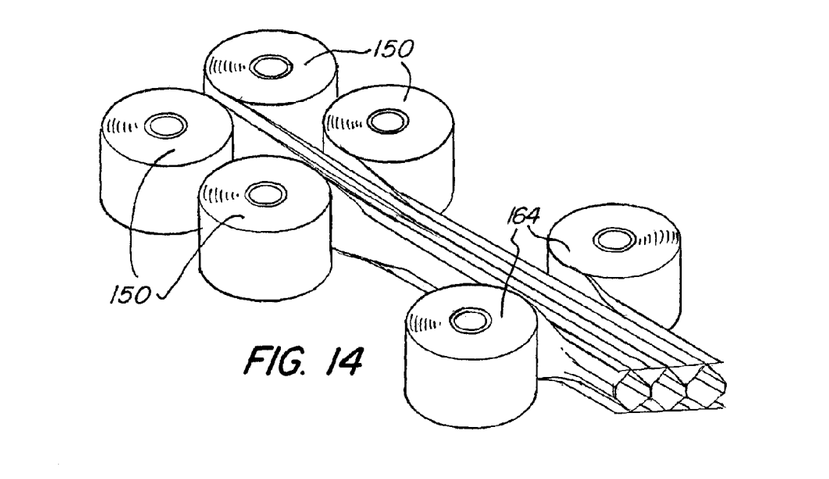
FIG. 14 is a perspective view of a first step of the process of FIG. 13.
Figure 15:
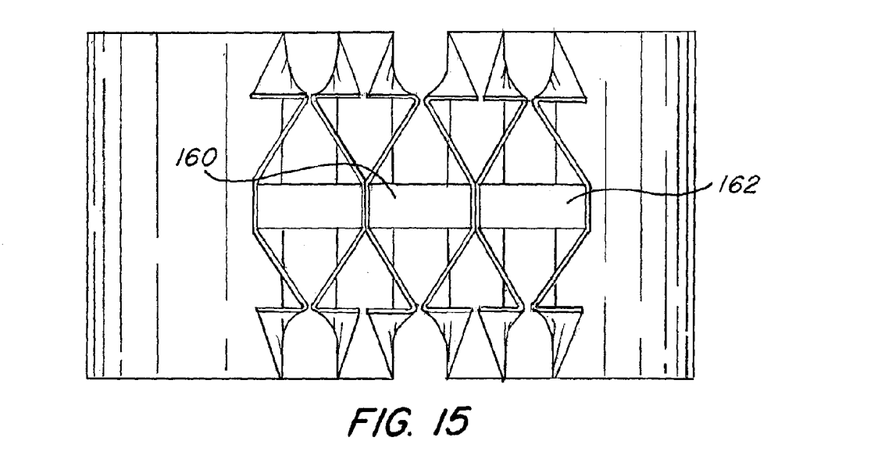
FIG. 15 is a cross-sectional view of FIG. 14.
Figure 16:
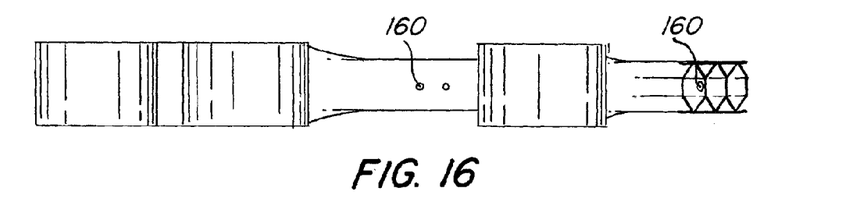
FIG. 16 is a side view of the passages of FIG. 15.

Referring now to FIGS. 14-16, shown are various views of the donut seals 160 according to "step 1" (shown in FIG. 13). FIG. 14 is a perspective view of a first step of the process of FIG. 13. Four sheets (2 outer and 2 inner) of thermoplastic material (e.g., vertical feed rolls 150) may be fed in a parallel fashion to form the internal side walls of the cells within the expandable structures. Although four sheets are depicted, more or less inner sheets are envisioned depending on the number of cells desired in a cell matrix. An additional sheet (e.g., side wall rolls 164) may be fed parallel to the outer surface of each outer sheet, forming the side walls of the expandable structure.

FIG. 15 is a cross-sectional view of FIG. 14 and shows the passages (e.g., tunnels, tubes, etc.) created by the sheets of material. A line of donut seals 160 may be imparted at various intervals along the surface of the sheets sealing the sheets together. While internal sealing bars 162 may be used for this purpose, the present teachings are not limited thereto. FIG. 16 is a side view of the passages of FIG. 15.

Figure 17:
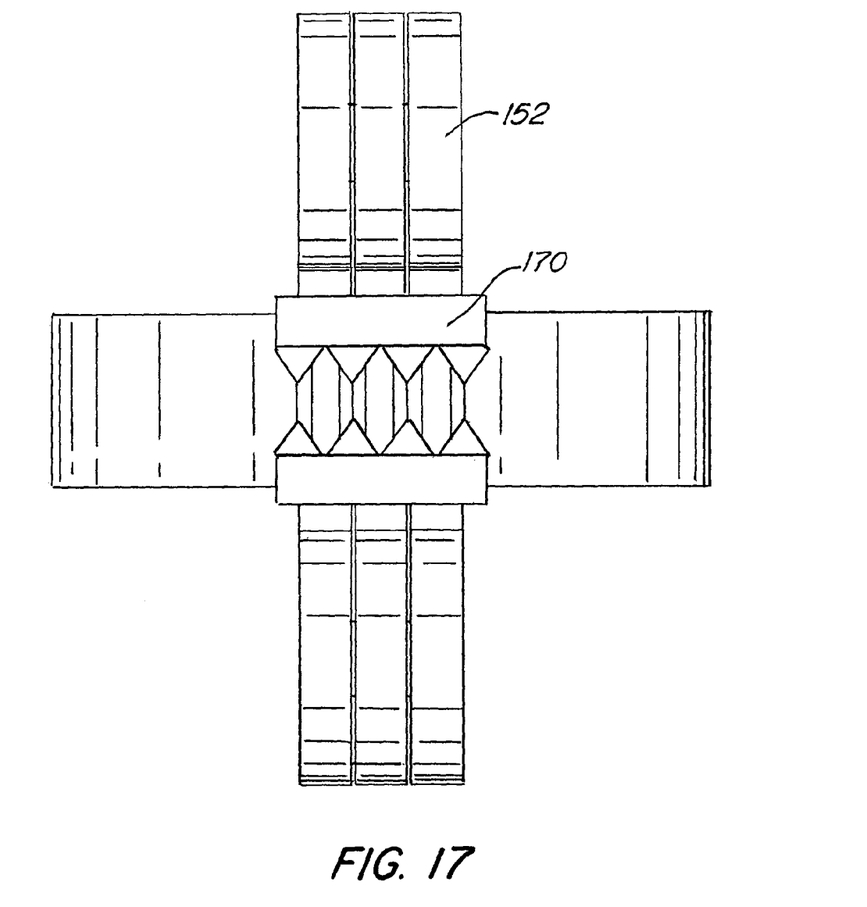
FIG. 17 is a cross-sectional view of a second step of the process of FIG. 13 including sealers.

Referring to FIG. 17, shown is a cross-sectional view of a second step of the process of FIG. 13 including sealers (e.g., sealing bars, etc.). A cell end feed roll 152 may feed sheets of material along the top and bottom surfaces of the structure. The end sheets may be sealed to the web (e.g., to top and bottom of cell matrix, etc.) by internal and external sealing bars 170. End sealing may include sealing any portion of the surface (e.g., periphery, etc.) of the structure and may or may not include adding additional sheets of material to accomplish this purpose. Although a concertina cut/seal bar is depicted, the sealing bars can cut and seal various configurations into the cell web, as discussed for the previous method of manufacturing expandable structures of the present teachings.

Figure 18:
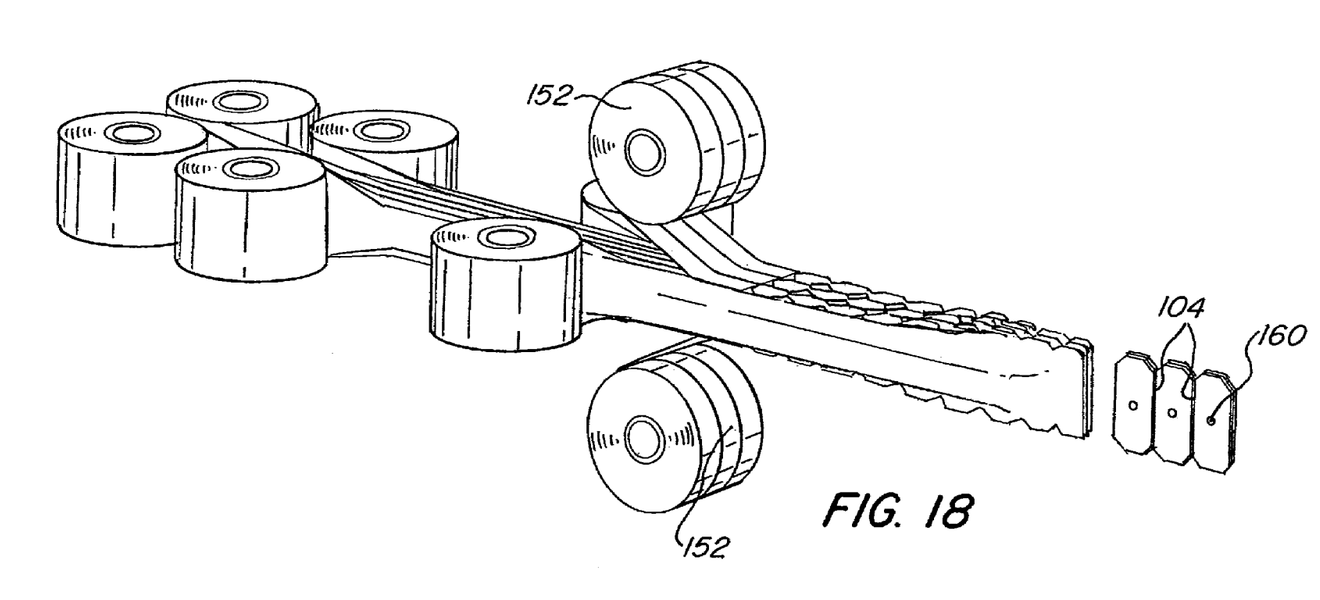
FIG. 18 is a perspective view of FIG. 13.

FIG. 18 shows a perspective view of FIG. 13. In particular, shown are various views of the vertical seals 104 according to "step 3". Vertical seals 104 may be imparted in the internal web sheets having donut seals 160. However, a similar seal may also be imparted on the side wall sheets. As shown, the vertical seal 104 may not traverse the plane of each side wall. An un-sealed area may allow for fluid communication with adjacent cells. A vertical cut/seal that traverses the entire length of each web may be imparted on the end rows of a cell matrix or where fluid communication between each cell is not desired.

FIGS. 19A-D depict yet another embodiment of a process for creating an expandable cell matrix according to the present teachings using sheets of lay flat extruded tubing 180. Extruded tubing 180 can be purchased with pre-made gussets or formed in line to create the desired shape of the cells. This presents an alternative roll feed configuration for creating an inline cell matrix. Sections of material may be cut to length and placed over a set of heat sealing mandrels (shown inside the extruded tubing in FIG. 19B) to create donut seals. A secondary mandrel 182 may create the cell-top, cell-bottom and vertical seals, although not limited thereto, which may complete the matrix. This may include adding additional sheets of material to the top and bottom of the extruded tubing.

Figure 19A:
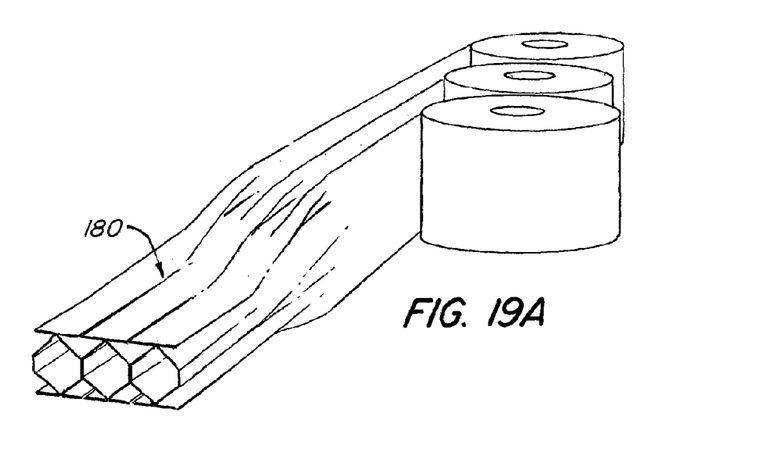
FIGS. 19A-D depict yet another embodiment of a process for creating an expandable cell matrix according to the present teachings using lay flat extruded tubing.
Figures 19B, 19C, 19D:
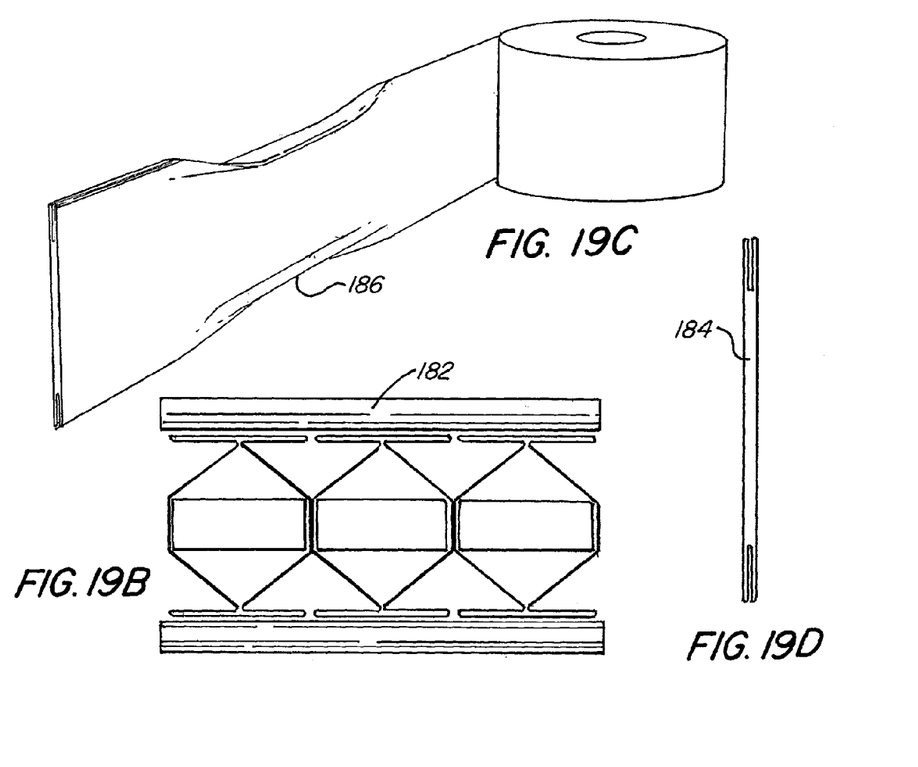

FIGS. 19C-D show an alternate configuration, which may be employed in one embodiment according to the present teachings. Shown is an inverted fold style 184 (e.g., cross section, etc.). The lay flat tubing 180 may transition 186 to inverted folds to create cell tops, although not limited thereto. These may be sealed together to help form the top and bottom of the structure, either instead of, or in addition to, using additional sheets of material.

Sealing may occur by any number of methods, including those methods commonly employed in the art to join films. Particularly, the methods may include those disclosed in U.S. Patent Publication No. 2011-0027507 (Ser. No. 12/511,729), which is incorporated herein by reference in its entirety. Such methods may be preferred for sealing the sheets of thermoplastic material. These methods may allow one surface of a sheet to be sealed without affecting adjacent sheets.

In a preferred embodiment, the above described methods may be used in a continuous manufacturing process to form long sheets of expandable structures that may be placed on a roll and cut to various sizes by an end user or cut to size in a later manufacturing step. However, structures of specific sizes may also be made as described by the above methods. What is meant by "continuous manufacturing process" is that the material may be provided in long lengths (e.g., by feed rolls, etc.) and the manufacturing process may be performed repeatedly on the lengths of material to create the expandable cell structures.

A dip tube, strip, port, or valve, etc., may be disposed along any outer edge of a cell and secured therein to assist in inflation or withdrawal of fluid (e.g., liquid, gas, etc.) from the cell. The strip may prevent the structure from collapsing upon opening and closing and also may guide fluid in the structure to the opening as fluid continues to be withdrawn.

Figure 20:
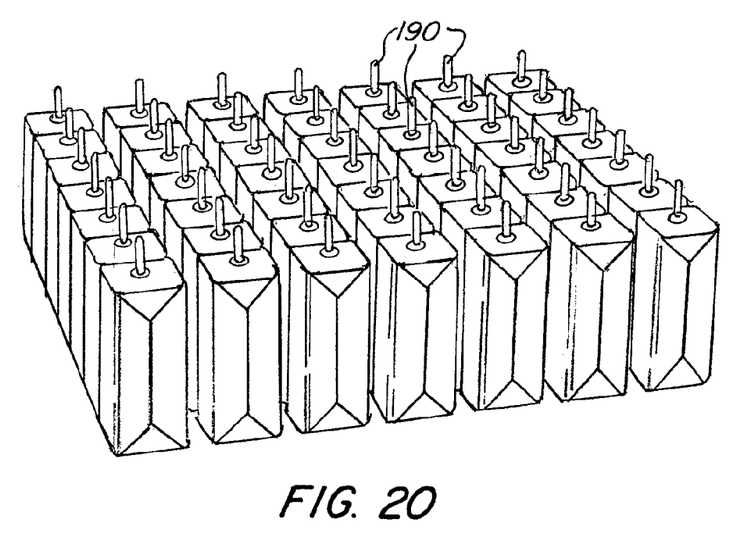
FIG. 20 shows one embodiment of the expandable cell structures according to the present teachings including ports.

Referring to FIG. 20, shown is one embodiment of the cell expandable structures according to the present teachings including ports 190. A port 190 may be placed on an outer surface of the cell matrix or individual cells, although not limited thereto. The port may sealingly engage with any surface of the structure. Alternatively, the port may be formed within the thermoplastic material, although one skilled in the art would appreciate there are different ways to form the port and the present teachings are not limited to any particular embodiment disclosed herein. The port may allow the structure to function as a container with inflation or dispensing means. FIG. 20 shows individual ports on each cell end of an expandable structure, which may allow each cell to function independently. In this configuration, certain of the individual cells may not communicate with each other (e.g., seals between certain cells may not have openings, etc.).

Figure 21:
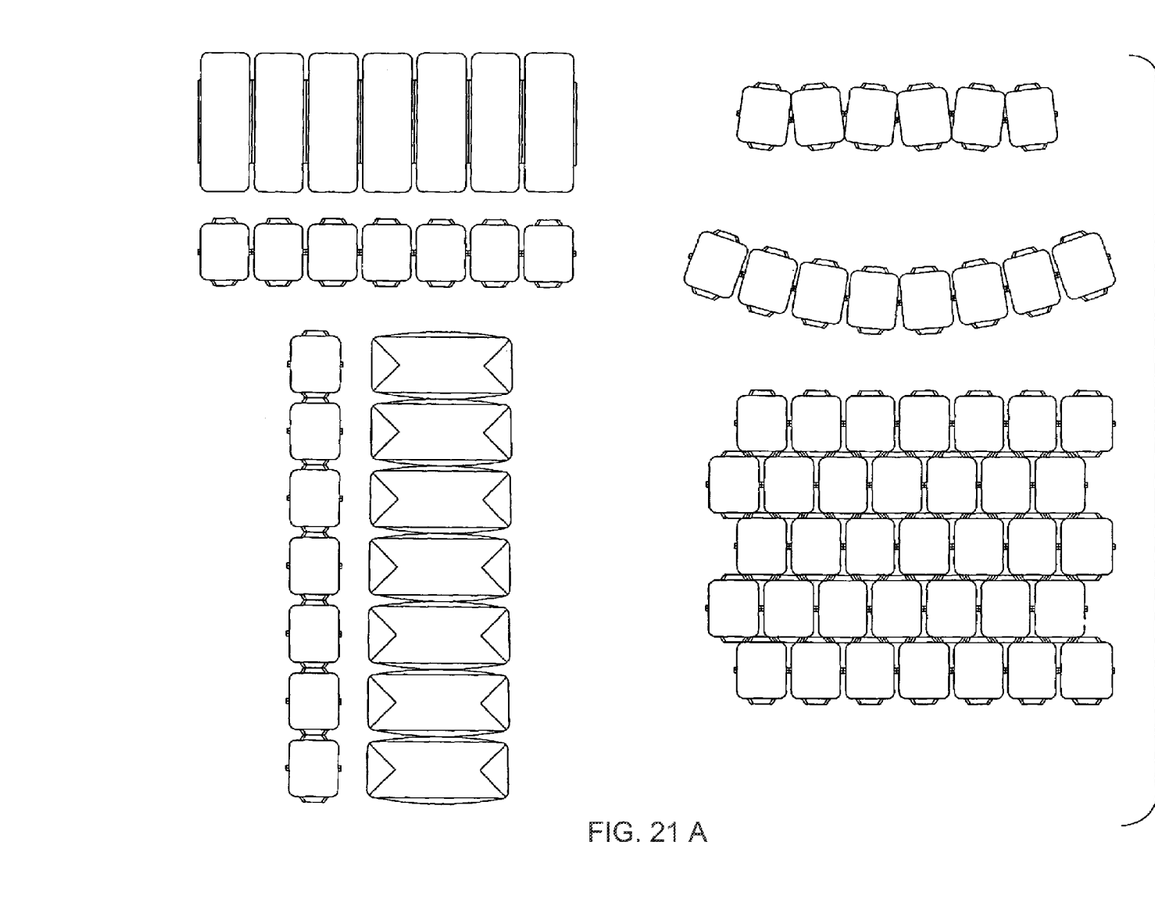
FIGS. 21A-B show different embodiments in which cells of the expandable structures according to the present teachings can communicate with each other.

FIGS. 21A-B show different embodiments in which cells of the expandable structures according to the present teachings can communicate with each other as well as some of the different orientations of the cells, although not limited thereto. Cells can be constructed to allow communication in the horizontal or vertical direction or both. A single row matrix may allow for linear flexibility. Additionally, the individual rows of each matrix can be arranged in an offsetting pattern in order to adjust the level of flexibility. The point of communication between each cell can also create various configurations. As an example, an s-curve profile and u-curved profile are shown in FIG. 21A. It is to be appreciated that the structure can be made in any number of different formations and the present teachings are not limited to any particular embodiment disclosed herein.

Figure 22:
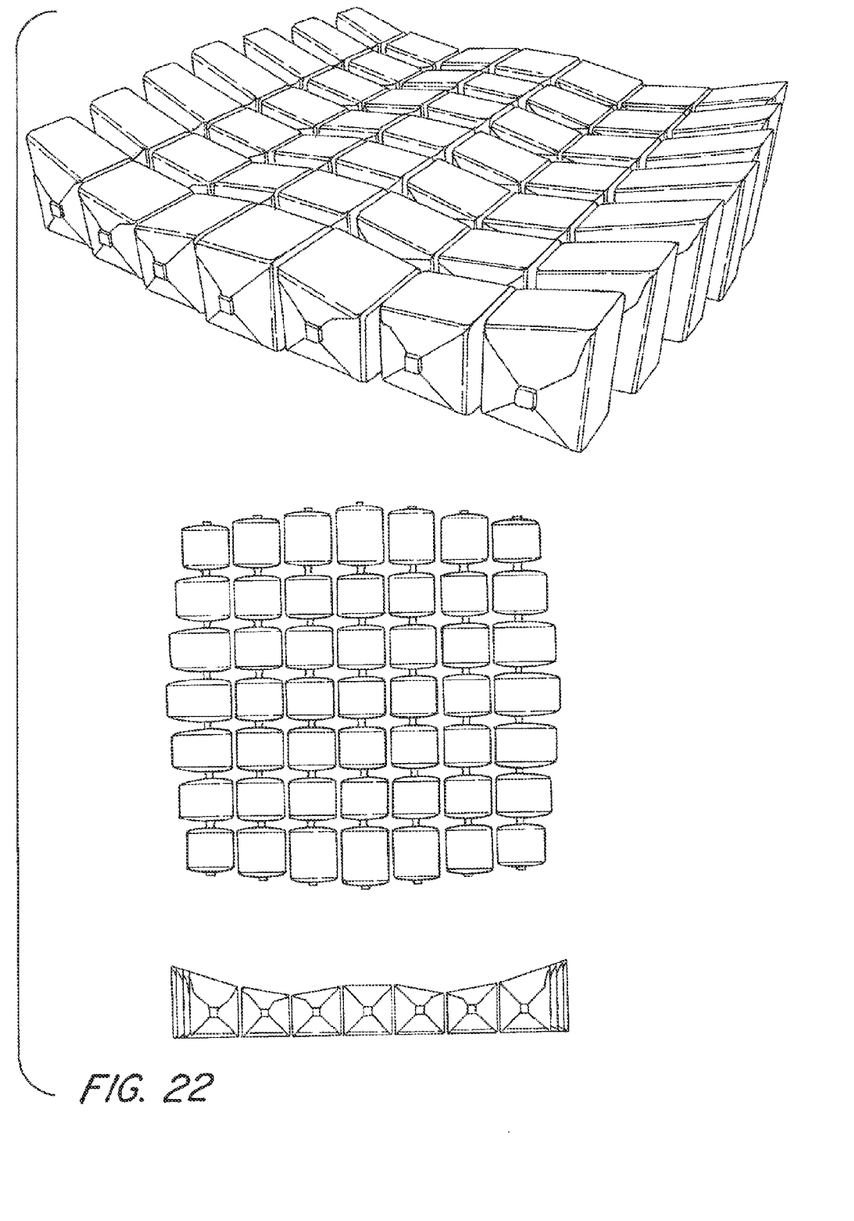
FIG. 22 shows one embodiment of the expandable cell matrix according to the present teachings including cells of varying heights employed to create a contoured surface.

FIG. 22 shows an example of an expandable cell matrix with cells of varying heights. The contoured surfaces that can be created by varying the cell heights can be useful in relieving interface pressure, properly positioning a patient, and providing other advantages in comfort, safety, etc., although not limited thereto. It is to be appreciated that the structure can be made in any number of different formations and the present teachings are not limited to any particular embodiment disclosed herein.

The expandable cell matrix structures of the present teachings are preferably incorporated into a support surface or cushion structure. For instance, the present teachings may be used in a mattress, pillow or as wheelchair cushion. Multiple cell matrices may be joined together to allow for a support structure having various adjustable inflation zones. One skilled in the art would appreciate the many uses for the structures, which are not limited to any particular embodiments disclosed herein.

Additional applications for the expandable cell matrix structures include coverings, compression garments, compresses, patient transfer devices, etc. For example, in one embodiment the expandable cell matrix may be manufactured as a patient thermoregulation blanket. In this way, conditioned air (e.g., temperature controlled, moisture controlled, etc.) may be fed through the expandable cell matrix adjacent to a patient's body (or other structure).

In one embodiment, one or more cells may have apertures (e.g., pin-sized holes in material, etc.) to allow air flow (e.g., controlled low air loss, etc.), which may assist with pressure relief and patient skin microclimate management, although not limited thereto. In another embodiment, the matrix may be manufactured in whole or in part from breathable non-woven material, although not limited thereto.

The use of lower mass films (e.g., relatively thin gauge polyethylenes and other thermoplastic polyolefins, etc.) for the material may be preferable to enhance the ability to warm or cool a patient. Such films may also be preferable to transmit and record patient vital signs (e.g., blood pressure, pulse, respiration, tissue interface pressure, etc.) as well as monitor activity (e.g., turning, leaving the bed, etc.). In one embodiment, the expandable cell matrix may employ sensors attached thereon or disposed within one cell or more cells, which may be distributed with the matrix as a prepackaged diagnostic system, although not limited thereto.

In certain embodiments, the expandable cell matrix could form a support with differing inflation patterns to assist in patient positioning (e.g., rolling, raising foot/head, etc.). A support formed by an expandable cell matrix may also be preferable for a bariatric support surface, although not limited thereto. The expandable cell matrix may provide increased height around its perimeter for a bolster effect, using increased inflation pressure of certain cells. This may provide for additional safety in certain embodiments (e.g., stability, to prevent head-entrapment, etc.). Meanwhile, partially inflated or un-inflated cells may be employed in other areas. This may be preferable, for example, when employed adjacent to a patient's sacrum to facilitate sacral muscle graft healing, or to alleviate pressure on a patient's ulcerated heels, although not limited thereto. One skilled in the art would appreciate the different uses for an expandable cell matrix configured for a particular purpose and the present teachings are not limited to any particular embodiment disclosed herein. In another embodiment, the expandable cell matrix may be employed as an internal component in a mattress or cushion.

In still further embodiments, the expandable cell matrix may be used as a therapeutic device. For example, it may provide vibrations (or some other percussion) for pulmonary therapy. To enhance pressure relief, the mode of inflation for the individual cells within the matrix may include alternating pressure, a wave motion, etc., although not limited thereto. The expandable cell matrix may be used to employ any number of different therapies (e.g., light, reflexology, etc.) and the present teachings are not limited to any particular embodiment disclosed herein.

The cell matrix may comprise layers of cells stacked to create multiple layer products, each layer having predetermined inflation patterns and or other characteristics. Support surfaces may utilize powered pumps for alternating pressure or low air loss. In an alternative, they could be pumped up once, the pump disconnected, and the surface used as a non-powered immersion surface, although not limited thereto.

Although specific features of the present teachings are shown in some drawings and not others, this is for convenience only as each feature may be combined with any or all of the features in accordance with the present teachings. While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for manufacturing an expandable cell matrix, comprising the steps of:
   providing first and second sheets of material, each sheet having a top, a bottom, and two sides;

creating a plurality of folds in the first and second sheets, each fold forming a top extending from the sheet along an axis between the two sides of the sheet;

cross sealing together the bottom of the first sheet to the top of the second sheet between each of the plurality of folds on each sheet, such that the folds on each sheet extend outwards from the two sheets;

gusset sealing a top of each fold to create a cell shape; and vertical sealing to form a plurality of cells.

2. The method of claim 1 wherein the cell matrix is adapted to be stored in a substantially flat form when un-inflated; and wherein the cell matrix is adapted to provide support when inflated with a fluid.

3. The method of claim 1 wherein the steps are repeated a plurality of times in a continuous manufacturing process.

4. The method of claim 1 wherein the plurality of cells creates an array of cells two or more of which are in fluid communication with each other.

5. The method of claim 1, further comprising the step of inflating the cell matrix by introducing fluid.

6. The method of claim 1, further comprising the step of creating a port on at least one cell for introducing fluid.

7. The method of claim 1 wherein the step of cross sealing creates one or more openings to allow fluid communication between adjacent folds.

8. The method of claim 1 wherein the step of gusset sealing comprises forming a gusset.

9. The method of claim 1 wherein the step of gusset sealing creates substantially square flat-top cells when inflated.

10. The method of claim 1 wherein the step of vertical sealing creates one or more openings to allow fluid communication between adjacent cells.

11. The method of claim 1 wherein the step of vertical sealing comprises using sealing heads to compress the cells laterally.

12. The method of claim 1 wherein each fold has at least two undulations.

13. The method of claim 2 wherein the fluid is air.

14. The method of claim 1 wherein the material is provided by two or more feed rolls.

15. The method of claim 1 wherein the material comprises sealable film.

16. The method of claim 1 wherein the material comprises thermoplastic.

17. An expandable cell matrix system, comprising:

a plurality of cells; and a port for introducing fluid into the plurality of cells;

wherein the cell matrix system is formed by creating a plurality of folds in first and second sheets of material, each sheet having a top, a bottom, and two sides, each fold forming a top extending from the sheet along an axis between the two sides of the sheet, cross sealing together the bottom of the first sheet to the top of the second sheet between each of the plurality of folds on each sheet, such that the folds on each sheet extend outwards from the two sheets, gusset sealing a top of each fold to create a cell shape, and vertical sealing to form the plurality of cells;

wherein the plurality of cells creates an array of cells at least two of which are in fluid communication with each other; and wherein the cell matrix is manufactured using a continuous manufacturing process.

18. The system of claim 17 wherein the cell matrix is adapted to be stored in a substantially flat form when un-inflated; and wherein the cell matrix is adapted to provide support when inflated with a fluid.

19. The system of claim 17 wherein the cell matrix forms a mattress.

20. The system of claim 17 wherein the cell matrix forms a cushion.

21. The system of claim 17 wherein the cell matrix forms a storage container.

22. The system of claim 17 wherein the material comprises recyclable material.

23. The system of claim 17 wherein the fluid is air.

24. The system of claim 17 wherein the cell matrix comprises a two-dimensional matrix; and wherein the plurality of cells are in fluid communication with each other in both a vertical and a horizontal direction.

* * * * *